US012686103B2

(12) United States Patent
LaHanier

(10) Patent No.: US 12,686,103 B2
(45) Date of Patent: Jul. 21, 2026

(54) SCREWDRIVERS WITH TRANSFORMABLE DRIVE TIPS

(71) Applicant: Lance LaHanier, Fife, WA (US)

(72) Inventor: Lance LaHanier, Fife, WA (US)

( * ) Notice: Subject to any disclaimer, the term of this patent is extended or adjusted under 35 U.S.C. 154(b) by 432 days.

(21) Appl. No.: 18/477,520

(22) Filed: Sep. 28, 2023

(65) Prior Publication Data

US 2024/0316733 A1 Sep. 26, 2024

Related U.S. Application Data

(60) Provisional application No. 63/491,349, filed on Mar. 21, 2023.

(51) Int. Cl.
*B25B 23/00* (2006.01)
*B25B 15/00* (2006.01)

(52) U.S. Cl.
CPC ........ *B25B 23/0042* (2013.01); *B25B 15/004* (2013.01)

(58) Field of Classification Search
CPC .... B25B 15/004; B25B 15/005; B25B 15/007
See application file for complete search history.

(56) References Cited

U.S. PATENT DOCUMENTS

| | | | | |
|---|---|---|---|---|
| 2,116,775 A * | 5/1938 | Blackburn | B25B 15/005 76/119 |
| 3,033,254 A * | 5/1962 | Ericson | B25B 15/005 144/34.1 |
| 4,328,721 A * | 5/1982 | Massari | B25B 15/005 81/439 |
| 4,488,462 A * | 12/1984 | Wall | B25B 15/007 81/439 |
| 4,867,018 A * | 9/1989 | Spector | B25B 15/007 81/439 |
| 8,770,069 B2 * | 7/2014 | Draizin | B25B 23/106 D8/86 |
| 2021/0229245 A1 * | 7/2021 | Kodsy | B25B 15/005 |

* cited by examiner

*Primary Examiner* — David B. Thomas
(74) *Attorney, Agent, or Firm* — Perkins Coie LLP

(57) ABSTRACT

Screwdrivers with transformable drive tips (and associated systems, devices, and methods) are disclosed herein. In one embodiment, a screwdriver includes a shaft assembly having a proximal end region and a distal end region opposite the proximal end region. The screwdriver further includes a handle at the proximal end region of the shaft assembly, and a drive tip at the distal end region of the shaft assembly. The drive tip is transformable between (i) a first configuration corresponding to a first drive tip type and (ii) a second configuration corresponding to a second drive tip type different from the first drive tip type. The screwdriver further includes a rotation mechanism configured to transition the drive tip between the first configuration and the second configuration. In some embodiments, the first drive tip type corresponds to a Phillips drive tip and/or the second drive tip type corresponds to a flathead drive tip.

19 Claims, 4 Drawing Sheets

SCREWDRIVERS WITH TRANSFORMABLE DRIVE TIPS

CROSS-REFERENCE TO RELATED APPLICATION(S)

The present application claims the benefit of U.S. Provisional Patent Application No. 63/491,349, filed Mar. 21, 2023, which is incorporated by reference herein in its entirety.

TECHNICAL FIELD

The present disclosure relates generally to screwdrivers with transformable drive tips. For example, several embodiments of the present technology relate to screwdrivers with drive tips that can be converted between a first drive tip configuration (e.g., a Phillips configuration) and a second drive tip configuration (e.g., a flathead configuration).

BACKGROUND

A screwdriver is a tool that is used for turning screws and that typically includes a shaft, a handle at a proximal end of the shaft, and a drive tip (or bit) at a distal end of the shaft. The drive tip is configured to engage a corresponding drive recess formed in a head of a screw. There are many different types of drives tips. The two most common types of drive tips are (i) flathead drive tips (also known as standard, slotted, slot-head, flat, flat-tip, flat-blade, blade, common blade, or straight drive tips) that are designed to engage slotted drive recesses formed in screw heads, and (ii) Phillips drive tips (also known as Phillips head drive tips or cross-head drive tips) that are designed to engage cross-shaped drive recesses formed in screw heads.

BRIEF DESCRIPTION OF THE DRAWINGS

Many aspects of the present disclosure can be better understood with reference to the following drawings. The components in the drawings are not necessarily to scale. Instead, emphasis is placed on illustrating clearly the principles of the present disclosure. The drawings should not be taken to limit the disclosure to the specific embodiments depicted, but are for explanation and understanding only.

DETAILED DESCRIPTION

Figure 1A:
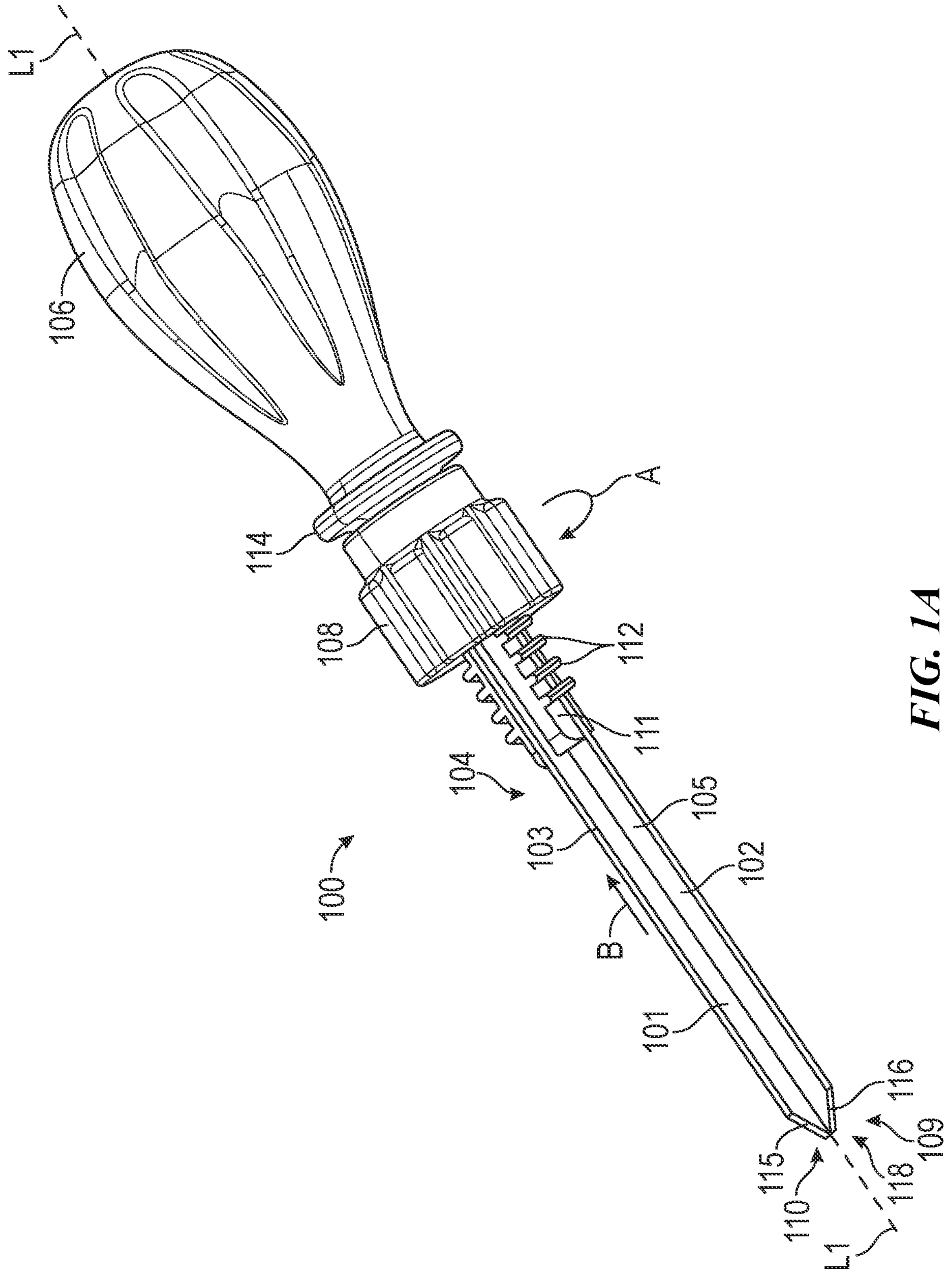
FIG. 1A is a partially schematic perspective view of a screwdriver having a drive tip in a first configuration, the screwdriver configured in accordance with various embodiments of the present technology.

Specific details of several embodiments of screwdrivers with transformable drive tips (and associated systems, devices, and methods) are described below. For example, several embodiments of the present technology described below are directed to screwdrivers with drive tips that can be converted between a first drive tip configuration (e.g., a Phillips configuration) and a second drive tip configuration (e.g., a flathead configuration). It will be appreciated that variations of the embodiments illustrated in the drawings exist and are within the scope of the present technology. For example, although the present technology is primarily described below in the context of screwdrivers with drive tips that are transformable between a Phillips configuration and a flathead configuration, a person of ordinary skill in the art will readily appreciate that other embodiments of the present technology can include drive tips that are transformable between different pairings of drive tip types. For example, screwdrivers configured in accordance with other embodiments of the present technology can include drive tips transformable between any combination of two or more drive tip types from the following list of drive tip types: flathead, Phillips, Pozidriv, Robertson (e.g., square), Torx (e.g., star), Torx Plus (e.g., 6-lobe), hexagon (e.g., Allen), spanner, Frearson (e.g., Reed and Prince), Japanese Industrial Standard (JIS), triangle, tri-wing, clutch head (e.g., bow tie), triple square, double hex, torq-set, tamperproof (e.g., security), and Y-adapter. Furthermore, it should be noted that embodiments of the present technology can have different configurations, components, and/or procedures than those shown or described herein. Moreover, a person of ordinary skill in the art will understand that embodiments of the present technology can have configurations, components, and/or procedures in addition to those shown or described herein, and that these and other embodiments can lack several of the configurations, components, and/or procedures shown or described herein without deviating from the present technology.

A. Overview

Screws are made with heads having a variety of different drive recesses (also known as drive styles). Each different drive recess typically requires a corresponding drive tip on a screwdriver to turn the corresponding screw. For example, a screw with a slotted drive recess typically requires a flathead drive tip to turn the screw; a screwdriver with a Phillips drive tip is typically not suited to properly engage the slotted drive recess and turn the screw (e.g., without camming out the slotted drive recess). As another example, a screw with a cross-shaped drive recess typically requires a Phillips drive tip to turn the screw; a screwdriver with a flathead drive tip is typically not suited to properly engage the cross-shaped drive recess and turn the screw (e.g., without camming out the cross-shaped drive recess).

As it is not uncommon to frequently encounter screws and other fasteners having differing types of drive recesses, it is not uncommon to require access to multiple different types of drive tips to tighten or loosen the screws and other fasteners. Constantly swapping between two different tools (e.g., two different screwdrivers) having differing drive tips and/or constantly interchanging detachable bits on a screwdriver, however, can be frustrating and/or time consuming. Furthermore, in the scenario in which the wrong drive tip for a drive recess is available but the proper drive tip for the drive recess is not readily available, it may not be possible at that time to properly tighten or loosen a corresponding screw or fastener.

To address these concerns, several embodiments of the present technology are directed to screwdrivers with transformable drive tips. For example, several embodiments of the present technology described below are directed to screwdrivers with drive tips that can be converted or transitioned between (i) a first configuration corresponding to a first type of drive tip (e.g., a Phillips drive tip) useable with a first type of drive recess (e.g., a cross-shaped drive recess), and (ii) a second configuration corresponding to a second type of drive tip (e.g., a flathead drive tip) different from the first type of drive tip and useable with a second type of drive recess (e.g., a slotted drive recess) different from the first type of drive recess. In one embodiment of the present technology, for example, a screwdriver includes a shaft assembly having a proximal end region and a distal end region opposite the proximal end region; a handle at the proximal end region; a drive tip at the distal end region; and a rotation mechanism. The drive tip can be transformable between a first drive tip configuration (e.g., a first drive tip mode, type, or style) and a second drive tip configuration (e.g., a second drive tip mode, type, or style) different from the first drive tip configuration. More specifically, the shaft assembly can include a first shaft having a first drive tip portion. The first drive tip portion can correspond to both the first drive tip configuration and the second drive tip configuration. The shaft assembly can further include a second shaft at least partially positioned within the first shaft and having a second drive tip portion. The second drive tip portion can correspond to (e.g., only) the first drive tip configuration. Using the rotation mechanism, the second shaft can be translated generally along a longitudinal axis of the screwdriver to position the second drive tip portion at—or withdraw the second drive tip portion from—the drive tip of the screwdriver. When the second drive tip portion is positioned at the drive tip of the screwdriver, the drive tip of the screwdriver can be in the first drive tip configuration in which the second drive tip portion in combination with the first drive tip portion forms a first type of drive tip (e.g., a Phillips drive tip). Additionally, when the second drive tip portion is withdrawn from the drive tip of the screwdriver, the first drive tip portion can be isolated and/or form a second type of drive tip (e.g., a flathead drive tip).

In this manner, a single screwdriver configured in accordance with the present technology can provide a plurality of types of drive tips for use with a corresponding plurality of types of drive recesses. As such, the present technology is expected to obviate the practice of carrying around multiple different screwdrivers that each include a different style of drive tip for tightening or loosening screws and other fasteners. Additionally, because the drive tips of screwdrivers of the present technology can be transformed between multiple different types of drive tips without needing to detach, remove, or physically separate parts (e.g., shafts or bits) from the screwdrivers (e.g., from the handle or from the shaft assembly), the present technology is expected to obviate the practice of (i) carrying around multiple different shafts and/or bits corresponding to multiple different styles of drive tips and/or (ii) interchanging shafts and/or bits on a screwdriver by detaching a first shaft and/or bit from the screwdriver and attaching a second shaft and/or bit to the screwdriver.

Figure 1B:
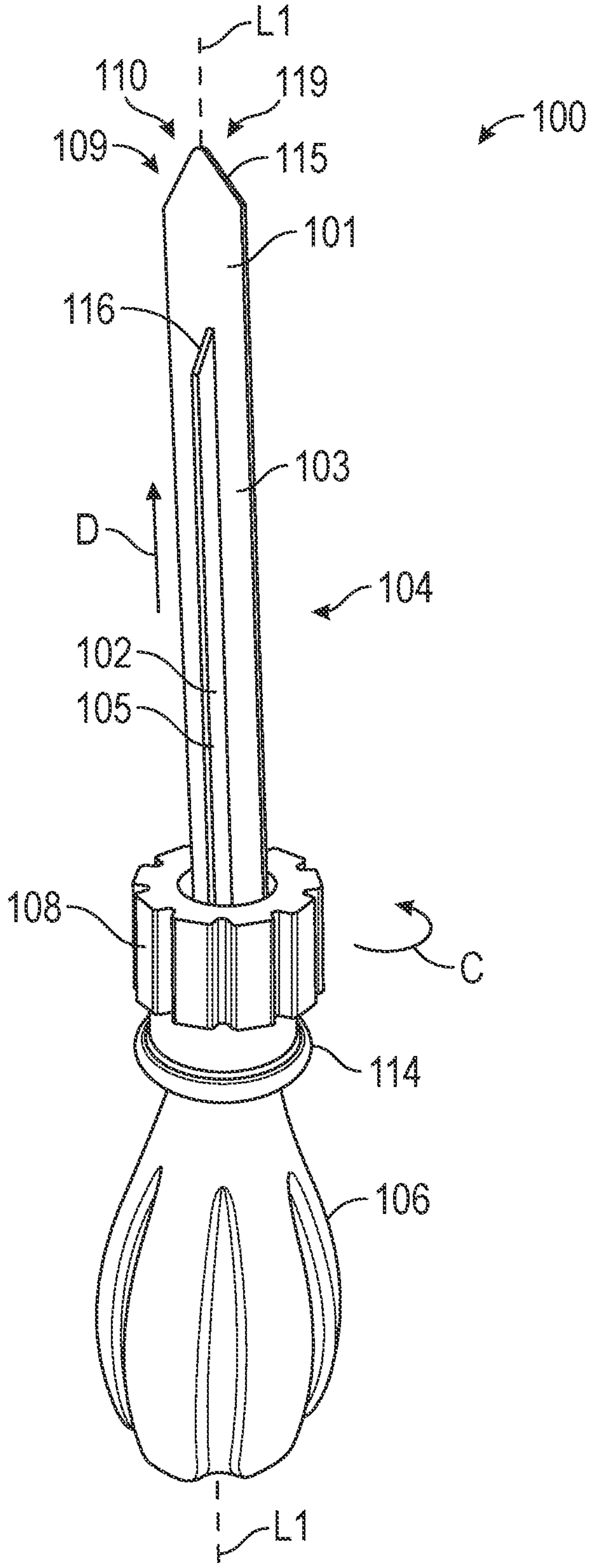
FIG. 1B is a partially schematic perspective view of the screwdriver of FIG. 1A with the drive tip in a second configuration.

B. Selected Embodiments of Screwdrivers with Transformable Drive Tips and Associated Systems, Devices, and Methods FIGS. 1A and 1B are partially schematic perspective views of a screwdriver 100 configured in accordance with various embodiments of the present technology. More specifically, FIG. 1A is a partially schematic perspective view of the screwdriver 100 having a drive tip 110 in a first configuration 118, and FIG. 1B is a partially schematic perspective view of the screwdriver 100 with the drive tip 110 in a second configuration 119. In some embodiments, the first configuration 118 can correspond to a Phillips configuration or mode of the screwdriver 100, and the second configuration 119 can correspond to a flathead configuration or mode of the screwdriver 100. As discussed in greater detail below, the drive tip 110 of the screwdriver 100 can be transformed (e.g., converted, transitioned, switched, changed, transmuted, moved, adjusted) between the first configuration 118 and the second configuration 119.

Figure 2:
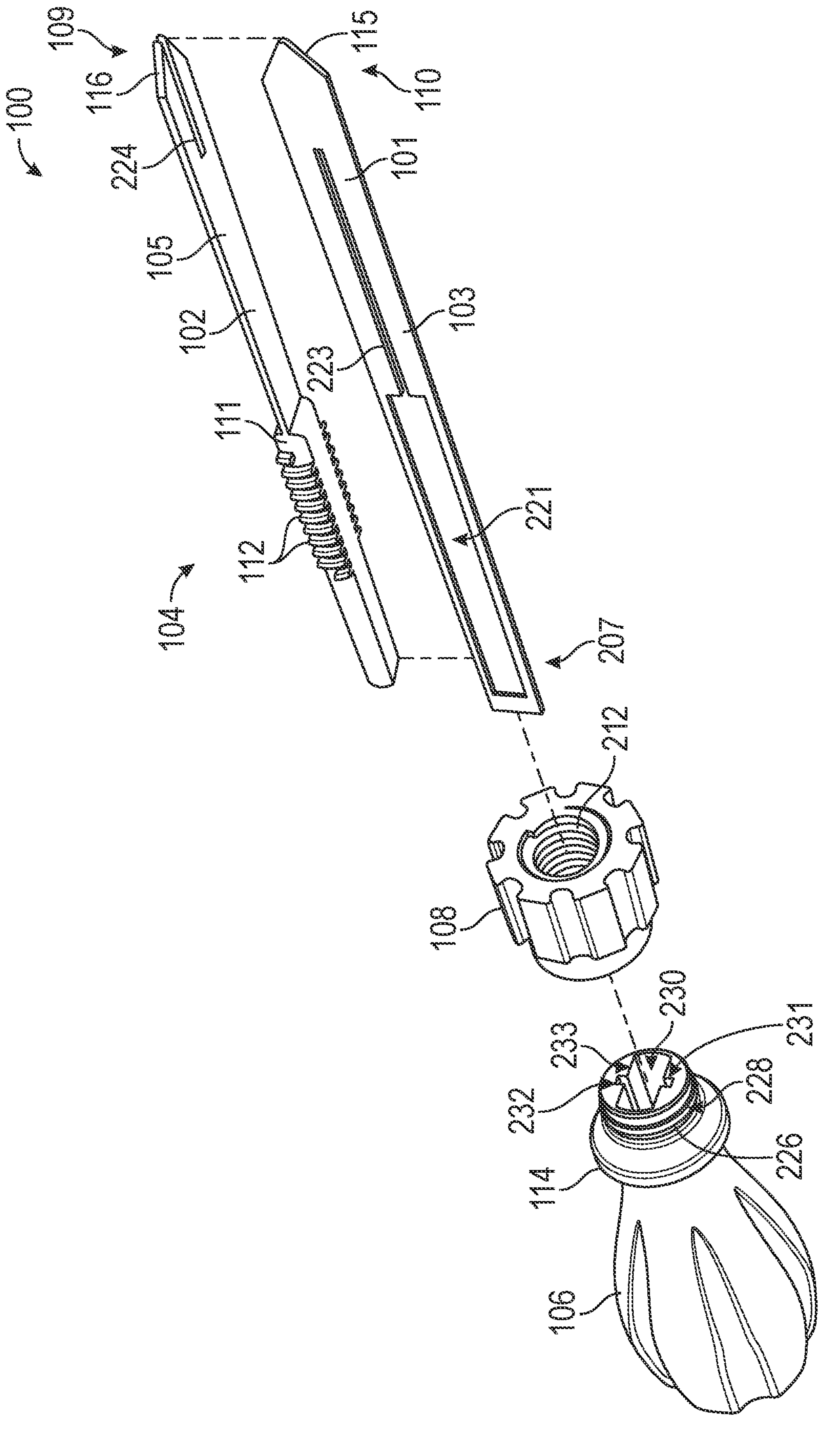
FIG. 2 is a partially schematic exploded view of the screwdriver of FIGS. 1A and 1B.

FIG. 2 is a partially schematic exploded view of the screwdriver 100 of FIGS. 1A and 1B. Referring to FIGS. 1A-2 together, the screwdriver 100 includes a shaft assembly 104, a handle 106, a rotation mechanism 108, and the drive tip 110 at a distal end region 109 of the shaft assembly 104. When the screwdriver 100 is in an assembled state, at least part of a proximal end region 207 (FIG. 2) of the shaft assembly 104 opposite the distal end region 109 is positioned within the handle 106, and at least part of the rotation mechanism 108 is positioned generally about the shaft assembly 104 and/or at a location generally along the shaft assembly 104 between the handle 106 and the drive tip 110.

As best shown in FIG. 2, the shaft assembly 104 of the screwdriver 100 includes a first shaft 101 and a second shaft 102. The first shaft 101 includes (i) an elongated body portion 103 and (ii) a drive tip portion 115, and the second shaft 102 includes (i) an elongated body portion 105 and (ii) a drive tip portion 116. In the illustrated embodiment, the elongated body portion 105 of the second shaft 102 includes (i) an enlarged portion 111 toward a proximal end region of the second shaft 102, and (ii) screw tines or threading 112 on the enlarged portion 111. As discussed in greater detail below, the threading 112 on the enlarged portion 111 is configured to interface and/or engage with corresponding threading 212 formed in or on an inner surface of the rotation mechanism 108.

The first shaft 101 and/or the second shaft 102 can be formed of metal and/or another suitable material, and/or may be smoothed or polished (e.g., to facilitate easy cleaning). Additionally, or alternatively, the first shaft 101 and/or the second shaft 102 can be formed and/or coated with a non-conductive material (e.g., such that the shaft assembly 104 of the screwdriver 100 is insulated). As shown, at least the distal end regions of the first and second shafts 101 and 102 are generally flat or planar (e.g., blade-like). In other embodiments, all or a subset of the first shaft 101 and/or all or a subset of the second shaft 102 can have a different shape than shown in the illustrated embodiment. For example, all or a subset of the first shaft 101 and/or all or a subset of the second shaft 102 can be hexagonal or at least partially hexagonal to facilitate a user engaging the shaft assembly 104 with a wrench (e.g., to assist the user in rotating the screwdriver 100, such as when the drive tip 110 of the screwdriver 100 is engaged with a corresponding drive recess in a head of a screw). Furthermore, although shown with a certain length, a certain width, and a certain thickness in the illustrated embodiment, the elongated body portion 103 and/or the elongated body portion 105 can have longer or shorter lengths (e.g., lengths between approximately 2 cm or less and approximately 30 cm or more), larger or smaller widths, and/or larger or smaller thicknesses in other embodiments of the present technology.

With continuing reference to FIG. 2, the second shaft 102 is configured to fit within (e.g., a hollowed center of) the first shaft 101. To this end, the first shaft 101 includes a void 221 (e.g., an aperture) and a notch 223 (e.g., a slot) formed in a center portion of the elongated body portion 103, and the second shaft 102 includes a notch 224 (e.g., a slot) formed at a distal end of the second shaft 102. As shown, the void 221 in the first shaft 101 is generally rectangular or 'O'-shaped. In addition, the void 221 extends (a) generally along a longitudinal axis of the first shaft 101 that runs generally parallel to a longitudinal axis L1 (FIGS. 1A and 1B) of the screwdriver 100 and (b) from a location at or near the proximal end region of the first shaft 101 toward a distal end region of the first shaft 101. The void 221 is sized and shaped to accommodate the enlarged portion 111 of the second shaft 102. The notch 223 formed in the first shaft 101 is connected to (e.g., integrated or continuous with) the void 221, and extends generally along the longitudinal axis of the first shaft 101 toward the distal end region of the first shaft 101 from an end of the void 221 that is nearest the distal end region of the first shaft 101. A width of the notch 223 can correspond to a thickness of a portion of the elongated body portion 105 located distal the enlarged portion 111 of the second shaft 102. Furthermore, the notch 224 formed in the second shaft 102 extends (a) generally along a longitudinal axis of the second shaft 102 that runs generally parallel to the longitudinal axis L1 of the screwdriver 100 and (b) from a distal end of the second shaft 102 toward the enlarged portion 111. As shown, the notch 224 contributes to the second shaft 102 having a two-pronged or generally 'H'-shaped distal end region. A width of the notch 224 can correspond to a thickness of a portion of the first shaft 101. Although shown with certain shapes, sizes, positions, and arrangements (e.g., relative to each other) in the illustrated embodiment, the void 221, the notch 223, and/or the notch 224 can have different shapes, sizes, positions, and/or arrangements (e.g., relative to each other) in other embodiments of the present technology.

To assemble the shaft assembly 104, the second shaft 102 is inserted within the first shaft 101. More specifically, the distal end of the second shaft 102 can be inserted into the void 221 formed in the first shaft 101. Thereafter, with at least the distal end of the second shaft 102 arranged generally orthogonal (e.g., perpendicular or skew orthogonal) to the first shaft 101, the notch 224 formed in the second shaft 102 can be aligned with the notch 223 formed in the first shaft 101. Then, the distal end of the second shaft 102 can be advanced distally and generally along the longitudinal axis of the first shaft 101 such that (i) the notch 224 is moved generally along the notch 223 and (ii) the first shaft 101 becomes interlocked with the second shaft 102. The second shaft 102 can simultaneously or sequentially be pivoted or rotated to move the enlarged portion 111 of the second shaft 102 into the void 221 in the first shaft 101. As shown in FIGS. 1A and 1B, in an assembled state of the shaft assembly 104, the longitudinal axes of the first and second shafts 101 and 102 can be arranged generally parallel to each other. Additionally, or alternatively, the second shaft 102 can be arranged generally orthogonal (e.g., perpendicular or skew orthogonal) to the first shaft 101 with lateral axes of the first and second shafts 101 and 102 that run generally orthogonal (e.g., perpendicular or skew orthogonal) to the longitudinal axes of the first and second shafts 101 and 102, respectively, arranged generally orthogonal (e.g., perpendicular or skew orthogonal) to each other.

As discussed in greater detail below, at least when the second shaft 102 is positioned within the first shaft 101, the second shaft 102 can be configured to move at least partially and generally along the longitudinal axis of the first shaft 101. Proximal movement of the second shaft 102 generally along the longitudinal axis of the first shaft 101 can be limited by a proximal portion of the enlarged portion 111 of the second shaft 102 abutting against a proximal end portion of the void 221 at or near a proximal end of the first shaft 101 and/or against a part of the handle 106 when the shaft assembly 104 is positioned within the handle 106. Additionally, or alternatively, distal movement of the second shaft 102 generally along the longitudinal axis of the first shaft 101 can be limited by (i) a distal portion of the enlarged portion 111 of the second shaft 102 abutting against a distal end portion of the void 221 and/or against a part of the handle 106 when the shaft assembly 104 is positioned within the handle 106, and/or (ii) a proximal end portion of the notch 224 abutting against a distal end portion of the notch 223. In other words, sizes (e.g., lengths, widths, thicknesses, shapes, etc.) of the enlarged portion 111, the void 221, the notch 223, and/or the notch 224 can be selected in some embodiments to tailor an extent the second shaft 102 is permitted to move generally along the longitudinal axis of the first shaft 101.

Furthermore, in some embodiments, when the shaft assembly 104 is in the assembled state, the notch 223 and/or the notch 224 can limit, hinder, or prevent the first shaft 101 and/or the second shaft 102 from rotating away from their generally orthogonal (e.g., perpendicular or skew orthogonal) arrangement relative to one another. Additionally, or alternatively, the enlarged portion 111 and/or the void 221 can limit, hinder, or prevent the first shaft 101 and/or the second shaft 102 from rotating away from their generally orthogonal arrangement relative to one another. Thus, when (i) the screwdriver 100 is in the assembled state, (ii) the drive tip 110 of the screwdriver 100 is engaged in a corresponding drive recess in a head of a screw, and (iii) a user applies torque to rotate the screwdriver 100 generally about its longitudinal axis L1 (FIGS. 1A and 1B), the enlarged portion 111, the void 221, the notch 223, and/or the notch 224 can at least partially enable the torque to be transferred to the screw, such as by hindering rotation of the first shaft 101 and/or the second shaft 102 away from their generally orthogonal arrangement relative to one another.

Although the second shaft 102 is configured to fit within the first shaft 101 in the illustrated embodiment, the second shaft 102 can be configured to accommodate the first shaft 101 in other embodiments of the present technology. For example, the second shaft 102 can include a void and/or a notch similar to the void 221 and/or the notch 223, respectively, shown in FIG. 2. Additionally, or alternatively, the first shaft 101 can include a notch similar to the notch 224 shown in FIG. 2. In these and other embodiments, the first shaft 101 can include screw tines or threading in addition to or in lieu of the threading 112 on the second shaft 102.

In the illustrated embodiment, the drive tip portion 115 of the first shaft 101 includes two slanted edges that form a generally triangular tip. As discussed in greater detail below, the drive tip portion 115 can form part of a first drive tip type (e.g., a Phillips drive tip) when the screwdriver 100 is in the first configuration 118 illustrated in FIG. 1A, and/or can form a second drive tip type (e.g., a flathead drive tip) when the screwdriver 100 is in the second configuration 119 illustrated in FIG. 1B. Although shown with two slanted edges and a generally triangular tip in the illustrated embodiment, the drive tip portion 115 can have another number of edges and/or other general shapes in other embodiments of the present technology. For example, in other embodiments, the drive tip portion 115 can include a distal edge that is arranged generally orthogonal (e.g., perpendicular or skew orthogonal) to the longitudinal axis of the first shaft 101 (e.g., similar to a conventional flathead drive tip or a keystone flathead drive tip). As another example, the drive tip portion 115 can include a different shape corresponding to at least part of another drive tip type (e.g., a drive tip type other than a flathead drive tip and/or a Phillips drive tip). As a specific example, the drive tip portion 115 can include a generally triangular shape that corresponds to a triangle drive tip when the screwdriver 100 is in the second configuration 119 illustrated in FIG. 1B and/or that can be combined with the drive tip portion 116 of the second shaft 102 to form another drive tip type (e.g., a Robertson or square drive tip) when the screwdriver 100 is in the first configuration 118 illustrated in FIG. 1A.

As shown, the drive tip portion 116 of the second shaft 102 is generally similar to the drive tip portion 115 of the first shaft 101. For example, the drive tip portion 116 includes two slanted edges that form a generally triangular tip. In contrast with the triangular tip of the drive tip portion 115, however, the triangular tip of the drive tip portion 116 is intersected and broken up by the notch 224 such that the distal end region of the elongated body portion 105 includes two prongs. As discussed above, the notch 224 facilitates (i) seating the second shaft 102 within the first shaft 101, (ii) interlocking the second shaft 102 with the first shaft 101 using the notch 223, and/or (ii) moving the second shaft 102 generally along the longitudinal axis of the first shaft 101. As discussed in greater detail below, the drive tip portion 116 can form part of the first drive tip type (e.g., a Phillips drive tip) when the screwdriver 100 is in the first configuration 118 illustrated in FIG. 1A. Although shown with two slanted edges in the illustrated embodiment, the drive tip portion 116 can have another number of edges and/or other general shapes in other embodiments of the present technology. For example, the drive tip portion 116 can include additional edges offset from the slanted edges shown in FIGS. 1A-2 (e.g., additional edges that are offset by approximately 45 degrees from the slanted edges shown in FIGS. 1A-2, and/or that form at least part of a Pozidriv drive tip when the screwdriver 100 is in the first configuration 118). As another example, the drive tip portion 116 can include a different shape corresponding to at least part of another drive tip type (e.g., a drive tip type other than a Phillips drive tip and/or a flathead drive tip). As a specific example, the drive tip portion 116 can include a generally triangular shape that can be combined with the drive tip portion 115 of the first shaft 101 (e.g., the generally triangular drive tip portion 115 in the specific example above) to form a particular drive tip type (e.g., a Robertson or square drive tip) when the screwdriver 100 is in the first configuration 118 illustrated in FIG. 1A.

Referring now to the handle 106 of the screwdriver 100, the handle 106 can be formed of plastic, nylon, wood, carbon fiber, or another suitable material. In some embodiments, the material used to form the handle 106 can be smoothed or polished (e.g., to facilitate easy cleaning). Additionally, or alternatively, the handle 106 can be formed and/or coated with a non-conductive material (e.g., such that the handle 106 is insulated).

As best shown in FIG. 2, the handle 106 of the screwdriver 100 can be sized and/or shaped to facilitate a user gripping the handle 106, maneuvering the drive tip 110 of the screwdriver 100 to a corresponding drive recess in a head of a screw, and/or twisting or rotating the screwdriver 100 generally about its longitudinal axis L1 (FIGS. 1A and 1B). For example, in the illustrated embodiment, the handle 106 is generally bulbous for comfortably fitting within a user's hand or palm. Additionally, or alternatively, the handle 106 includes cutouts, ridges, and/or other features to enhance a user's grip of the handle 106. In these and other embodiments, the handle 106 includes a lip 114 or projection against which a user can press (e.g., while the user holds the screwdriver 100 with the screwdriver 100 positioned within the purlicue of the user's hand and/or while the user twists the screwdriver 100 generally about its longitudinal axis L1). Although shown with a specific shape, a specific size, and specific features in the illustrated embodiment, the handle 106 can have other shapes, sizes, and/or features in other embodiments of the present technology. For example, the handle 106 of the screwdriver 100 can have a generally cylindrical shape, can lack cutouts and/or ridges, and/or can lack a lip 114 in other embodiments of the present technology.

In the illustrated embodiment, the handle 106 includes a neck 226 and a protrusion 228 (e.g., an annular protrusion) on the neck 226. As discussed in greater detail below, when the screwdriver 100 is in the assembled state, the rotation mechanism 108 can sit on the neck 226 of the handle 106. More specifically, the rotation mechanism 108 can receive at least a distal end portion of the neck 226 of the handle 106 in a corresponding cavity of the rotation mechanism 108, and can be held in place on the neck 226 using the protrusion 228 in a manner that permits the rotation mechanism 108 to rotate generally about the longitudinal axis L1 (FIGS. 1A and 1B) of the screwdriver 100.

The center of the handle 106 can be generally hollow. For example, the handle 106 can include a cavity 230 configured to receive the proximal end region 207 of the shaft assembly 104. As shown in FIG. 2, the cavity 230 can include (i) a first notch 231 (e.g., a first slot) configured to receive a first side of the first shaft 101 of the shaft assembly 104, (ii) a second notch 232 (e.g., a second slot) configured to receive a second side of the first shaft 101 opposite the first side, and (iii) a void or recess 233 configured to receive at least part of the enlarged portion 111 of the second shaft 102 (e.g., at least part of the enlarged portion 111 positioned beneath the threading 112). In some embodiments, when the screwdriver 100 is in the assembled state, the first notch 231 and the second notch 232 can limit, hinder, or prevent the first shaft 101 from rotating within the cavity 230 of the handle 106. In these and other embodiments, the recess 233 can limit, hinder, or prevent the enlarged portion 111 (and therefore the second shaft 102) from rotating within the cavity 230 of the handle 106. As such, when the drive tip 110 of the screwdriver 100 is engaged in a corresponding drive recess in a head of a screw and a user applies torque to rotate the screwdriver 100 generally about its longitudinal axis L1 (FIGS. 1A and 1B), the first notch 231, the second notch 232, and/or the recess 233 can at least partially enable the torque to be transferred to the screw by hindering rotation of the first shaft 101 and/or the second shaft 102 within the cavity 230 of the handle 106.

Figure 3A:
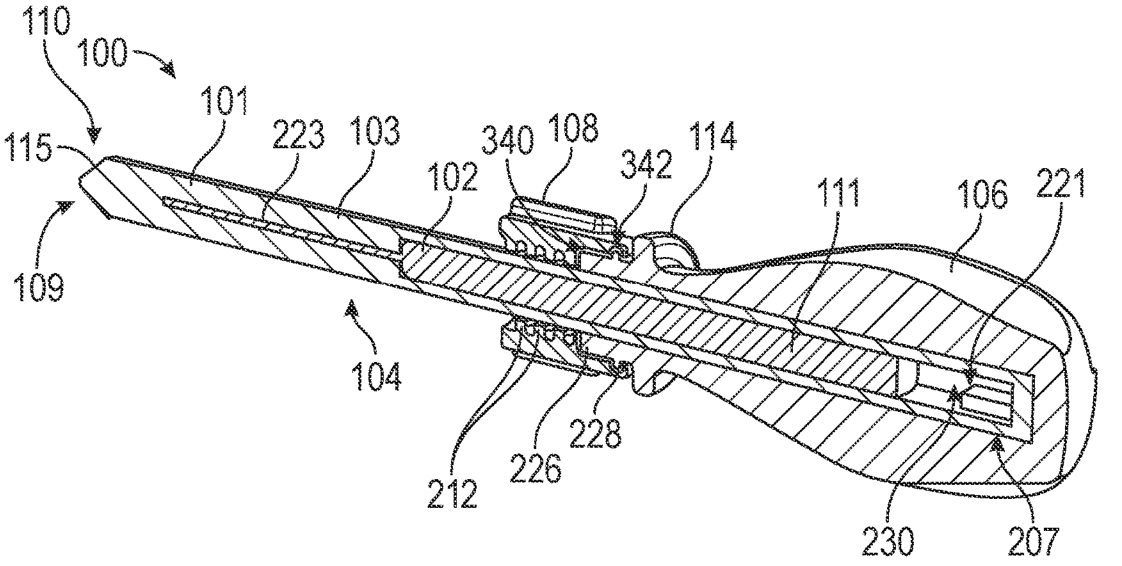
FIG. 3A is a partially schematic cross-sectional, perspective view of the screwdriver of FIGS. 1A-2.
Figure 3B:
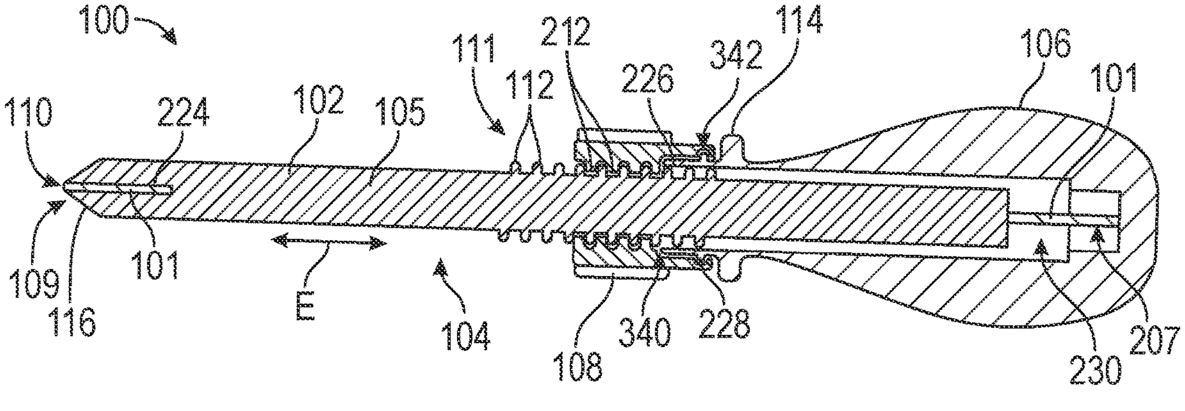
FIG. 3B is a partially schematic cross-sectional, side view of the screwdriver of FIGS. 1A-2.

FIG. 3A is a partially schematic cross-sectional, perspective view of the screwdriver 100 of FIGS. 1A-2 taken along a first plane that intersects and is generally parallel to the first shaft 101 in FIG. 1A, and FIG. 3B is a partially schematic cross-sectional, side view of the screwdriver 100 of FIGS. 1A-2 taken along a second plane that intersects and is generally parallel to the second shaft 102 in FIG. 1A. The first plane can (a) include or extend in a direction generally parallel to the longitudinal axis of the first shaft 101 and/or (b) include or extend in a direction generally parallel to the lateral axis of the first shaft 101. Additionally, or alternatively, the second plan can (a) include or extend in a direction generally parallel to the longitudinal axis of the second shaft 102 and/or (b) include or extend in a direction generally parallel to the lateral axis of the second shaft 102.

Referring to FIGS. 2 and 3A together, when the screwdriver 100 is in the assembled state, a proximal end region of the first shaft 101 is seated within the cavity 230 of the handle 106. More specifically, sides of the first shaft 101 are each received in a respective one of the first notch 231 (FIG. 2) and the second notch 232 (FIG. 2) of the cavity 230, and all or a subset of the proximal end region of the first shaft 101 is positioned within an interior of the handle 106. In some embodiments, the proximal end region of the first shaft 101 can be fixedly seated and/or fixedly held in the handle 106 such that, when the screwdriver 100 is in the assembled state, the first shaft 101 is limited, prevented, or hindered from moving into or out of the handle 106 generally along the longitudinal axis L1 (FIGS. 1A and 1B) of the screwdriver 100. For example, the proximal end region of the first shaft 101 can be fixedly seated and/or fixedly held in the handle 106 using an adhesive and/or a pin lock (e.g., a pin or protrusion that extends from a sidewall of the handle 106 into the cavity 230 of the handle 106 and at least partially through the first shaft 101 and/or the void 221 in the center of the first shaft 101). As another example, the proximal end region of the first shaft 101 can be fixedly seated and/or fixedly held in the handle 106 using one or more snap locks or joints (e.g., one or more cantilever snap joints, L-shaped snap joints, torsion snap joints, annular snap joints), such as one or more snap joints positioned on sidewalls and/or at a bottom portion of the cavity 230 of the handle 106. As still another example, in embodiments in which the first shaft 101 is 3D printed or otherwise formed with the handle 106, the first shaft 101 can be integrated with the handle 106, or the handle 106 can include a protrusion that juts into and/or across the cavity 230 and at least partially through the void 221 in the center of the first shaft 101.

Referring now to FIGS. 2 and 3B together, when the screwdriver 100 is in the assembled state, at least part of a proximal end region of the second shaft 102 can be seated within the cavity 230 of the handle 106. More specifically, with the enlarged portion 111 of the elongated body portion 105 of the second shaft 102 positioned within the void 221 (FIGS. 2 and 3A) in the center of the first shaft 101, at least part of the proximal end region of the second shaft 102 can be received in the recess 233 (FIG. 2) of the cavity 230 and positioned within the interior of the handle 106. As discussed in greater detail below, the threading 112 on the enlarged portion 111 of the second shaft 102 and the corresponding threading 212 in the rotation mechanism 108 (i) can translate the second shaft 102 generally along the longitudinal axis L1 (FIGS. 1A and 1B) of the screwdriver 100 and in directions generally parallel to arrow E (FIG. 3B) when the rotation mechanism 108 is rotated, and/or (ii) can limit, hinder, or prevent motion of the second shaft 102 generally along the longitudinal axis L1 of the screwdriver 100 and in directions generally parallel to the arrow E when the rotation mechanism 108 is not rotating.

Referring to FIGS. 3A and 3B together, the rotation mechanism 108 includes a cavity 340 formed in a proximal end region of the rotation mechanism 108. The cavity 340 is sized and shaped to receive at least a distal end region of the neck 226 of the handle 106. Additionally, the cavity 340 includes a recess 342 (e.g., an annular recess) configured to receive the protrusion 228 on the neck 226 of the handle 106. Thus, when the screwdriver 100 is in the assembled state, the rotation mechanism 108 receives at least part of the neck 226 of the handle 106 within the cavity 340 such that the protrusion 228 on the neck 226 of the handle 106 is seated within the recess 342 of the cavity 340. When the protrusion 228 is seated within the recess 342, independent motion of the handle 106 and/or of the rotation mechanism 108 relative to one another that is generally along the longitudinal axis L1 (FIGS. 1A and 1B) of the screwdriver 100 can be largely prevented, hindered, or limited. Additionally, or alternatively, when the protrusion 228 is seated within the recess 342, the rotation mechanism 108 can remain rotatable generally along the arrow A (FIG. 1A) and/or the arrow C (FIG. 1B).

As best shown in FIG. 3B, the threading 212 formed in or on an interior surface of the rotation mechanism 108 can engage or interface with the threading 112 on the enlarged portion 111 of the second shaft 102. Thus, as the rotation mechanism 108 is rotated generally about the longitudinal axis L1 (FIGS. 1A and 1B) of the screwdriver 100 and generally along the arrow A (FIG. 1A), the threading 212 on the interior surface of the rotation mechanism 108 can retract or draw the second shaft 102 proximally and generally along the longitudinal axis L1 of the screwdriver 100 and in a direction generally parallel to arrow B (FIG. 1A) to, for example, transition the drive tip 110 of the screwdriver 100 toward the second configuration 119 illustrated in FIG. 1B. Additionally, or alternatively, as the rotation mechanism 108 is rotated generally about the longitudinal axis L1 of the screwdriver 100 and generally along the arrow C (FIG. 1B), the corresponding threading 212 on the interior surface of the rotation mechanism 108 can extend or drive the second shaft 102 distally and generally along the longitudinal axis L1 of the screwdriver 100 and in a direction generally parallel to arrow D (FIG. 1B) to, for example, transition the drive tip 110 of the screwdriver 100 toward the first configuration 118 illustrated in FIG. 1A.

To assemble the screwdriver 100, the shaft assembly 104 can first be assembled by inserting the second shaft 102 into the first shaft 101 in a manner consistent with the discussion above. Thereafter, the proximal end region 207 of the shaft assembly 104 can be inserted into the cavity 230 of the handle 106. More specifically, the first shaft 101 can be inserted into the first notch 231 and the second notch 232 of the cavity 230, and the proximal end portion of the enlarged portion 111 can be inserted into the recess 233 of the cavity 230. Alternatively, the handle 106 can be formed about the proximal end region 207 of the shaft assembly 104.

With the proximal end region 207 of the shaft assembly 104 seated within the cavity 230 of the handle 106, the rotation mechanism 108 can be placed about or around the shaft assembly 104 by (i) inserting the distal end region 109 of the shaft assembly 104 into the cavity 340 of the rotation mechanism 108 and (ii) sliding the rotation mechanism 108 proximally over the shaft assembly 104 until the threading 212 in the rotation mechanism 108 contacts the threading 112 on the enlarged portion 111 of the second shaft 102. Then, the rotation mechanism 108 can be rotated generally about the longitudinal axis L1 (FIGS. 1A and 1B) of the screwdriver 100 such that the threading 212 on the rotation mechanism 108 is engaged with the threading 112 on the enlarged portion 111 of the second shaft 102. Rotation of the rotation mechanism 108 can continue until (i) at least part of the neck 226 of the handle 106 is received within the cavity 340 of the rotation mechanism 108 and (ii) the protrusion 228 on the neck 226 of the handle 106 is seated within the recess 342 of the rotation mechanism 108.

In other embodiments of the present technology, assembly of the screwdriver 100 can include one or more different steps and/or a different ordering of one or more of the steps discussed above. For example, after assembling the shaft assembly 104, the rotation mechanism 108 can be placed about or around the shaft assembly 104 either by inserting the distal end region 109 of the shaft assembly 104 into the cavity 340 of the rotation mechanism 108, or by inserting the proximal end region 207 of the shaft assembly 104 into the rotation mechanism 108 via the opening at a distal end region of the rotation mechanism 108. Continuing with this example, after placing the rotation mechanism 108 about the shaft assembly 104, the rotation mechanism 108 (i) can be slid generally along a longitudinal axis of the shaft assembly 104 that runs generally parallel to the longitudinal axes of the first and second shafts 101 and 102 until the rotation mechanism 108 is brought into contact with the threading 112 on the enlarged portion 111 of the second shaft 102, and (ii) can be rotated generally about the longitudinal axis of the shaft assembly 104 such that the threading 212 on the rotation mechanism 108 is engaged with the threading 112 on the enlarged portion 111 of the second shaft 102. Next, the proximal end region 207 of the shaft assembly 104 can be inserted into the cavity 230 in handle 106. Insertion of the proximal end region 207 of the shaft assembly 104 into the cavity 230 in the handle 106 can include inserting the neck 226 of the handle 106 into the cavity 340 in the rotation mechanism 108 and/or seating the protrusion 228 on the neck 226 of the handle 106 in the recess 342. Additionally, or alternatively, the rotation mechanism 108 can be rotated until the neck 226 of the handle 106 is received in the cavity 340 in the rotation mechanism 108 and/or until the protrusion 228 is seated within the recess 342.

In other embodiments, before assembling, inserting, and/or installing the shaft assembly 104 into the handle 106 and/or into the rotation mechanism 108, the rotation mechanism 108 can be placed on the neck 226 of the handle 106 with the protrusion 228 seated within the recess 342. Then, the shaft assembly 104 can be installed by inserting the proximal end region 207 of the shaft assembly 104 into the rotation mechanism 108, rotating the shaft assembly 104 to engage the threading 112 on the enlarged portion 111 of the second shaft 102 with the threading 212 in the rotation mechanism 108, and inserting the proximal end region 207 of the shaft assembly 104 into the cavity 230 in the handle 106. In still other embodiments, all or a subset of the screwdriver 100 can be 3D-printed such that one or more parts of the screwdriver 100 are formed together and in an assembled state or in a partially assembled state.

Operation of the screwdriver 100 will now be described with reference to FIGS. 1A and 1B. Assuming that the screwdriver 100 is initially in the first configuration 118 shown in FIG. 1A, the drive tip 110 of the screwdriver 100 can be transitioned toward the second configuration 119 illustrated in FIG. 1B by rotating the rotation mechanism 108 generally about the longitudinal axis L1 of the screwdriver 100 and in a direction generally along the arrow A shown in FIG. 1A. As the rotation mechanism 108 is rotated in the direction generally along the arrow A, the threading 212 (FIG. 2) on the rotation mechanism 108 engages with the threading 112 on the enlarged portion 111 of the second shaft 102. Because the rotation mechanism 108 is anchored to the handle 106 via the protrusion 228 (FIGS. 2-3B) seated within the recess 342 (FIGS. 3A and 3B), rotating the rotation mechanism 108 in the direction generally along the arrow A (FIG. 1A) can, via the threading 112 and the threading 212, draw the second shaft 102 generally along the longitudinal axis L1 of the screwdriver 100 and in a direction generally parallel to the arrow B shown in FIG. 1A. Moving the second shaft 102 in the direction generally parallel to the arrow B from the position shown in FIG. 1A can withdraw the drive tip portion 116 of the second shaft 102 from the drive tip 110 while leaving the drive tip portion 115 on the first shaft 101 in place (e.g., such that the drive tip portion 115 is isolated at the drive tip 110). In this manner, the drive tip 110 of the screwdriver 100 can be transformed from the first configuration 118 shown in FIG. 1A to the second configuration 119 shown in FIG. 1B.

In some embodiments, the second configuration 119 can correspond to a flathead configuration of the screwdriver 100. In these embodiments, after the drive tip 110 of the screwdriver 100 is transitioned to the second configuration 119, the drive tip portion 115 of the first shaft 101 can be engaged with a slotted drive recess formed in a head of a screw. Thereafter, the screwdriver 100 can be rotated (e.g., using the handle 106) generally about its longitudinal axis L1 to turn the screw and (e.g., via threading on the screw) drive the screw into—or withdraw the screw from—an object or material.

Assuming now that the screwdriver 100 is in the second configuration 119 shown in FIG. 1B, the drive tip 110 of the screwdriver 100 can be transitioned toward the first configuration 118 illustrated in FIG. 1A by rotating the rotation mechanism 108 generally about the longitudinal axis L1 of the screwdriver 100 and in a direction generally along the arrow C shown in FIG. 1B. As the rotation mechanism 108 is rotated in the direction generally along the arrow C, the threading 212 (FIG. 2) on the rotation mechanism 108 engages with the threading 112 on the enlarged portion 111 of the second shaft 102. Because the rotation mechanism 108 is anchored to the handle 106 via the protrusion 228 (FIGS. 2-3B) seated within the recess 342 (FIGS. 3A and 3B), rotating the rotation mechanism 108 in the direction generally along the arrow C (FIG. 1B) can, via the threading 112 and the threading 212, drive the second shaft 102 generally along the longitudinal axis L1 of the screwdriver 100 and in a direction generally parallel to the arrow D shown in FIG. 1B. Moving the second shaft 102 in the direction generally parallel to the arrow D from the position shown in FIG. 1B can translate the drive tip portion 116 of the second shaft 102 toward the drive tip portion 115 on the first shaft 101 (e.g., until the drive tip portion 116 is arranged generally orthogonal (e.g., perpendicular or skew orthogonal) to the drive tip portion 115 and/or forms part of the drive tip 110). In this manner, the drive tip 110 of the screwdriver 100 can be transformed from the second configuration 119 shown in FIG. 1B to the first configuration 118 shown in FIG. 1A.

In some embodiments, the first configuration 118 can correspond to a Phillips configuration of the screwdriver 100. In these embodiments, after the drive tip 110 of the screwdriver 100 is transitioned to the first configuration 118, the drive tip portion 115 of the first shaft 101 and the drive tip portion 116 of the second shaft 102 can be engaged with a cross-shaped drive recess formed in a head of a screw. Thereafter, the screwdriver 100 can be rotated (e.g., using the handle 106) generally about its longitudinal axis L1 to turn the screw and (e.g., via threading on the screw) drive the screw into—or withdraw the screw from—an object or material. As such, the present technology facilitates using the same screwdriver 100 to turn screws with different drive recesses corresponding to two or more different types or styles of drive tips (e.g., without detaching portions of the shaft assembly 104 from the screwdriver 100 and/or without detaching portions of the drive tip 110 from the screwdriver 100).

C. Conclusion

The above detailed descriptions of embodiments of the technology are not intended to be exhaustive or to limit the technology to the precise form disclosed above. Although specific embodiments of, and examples for, the technology are described above for illustrative purposes, various equivalent modifications are possible within the scope of the technology as those skilled in the relevant art will recognize. For example, although steps are presented in a given order above, alternative embodiments may perform steps in a different order. Furthermore, the various embodiments described herein may also be combined to provide further embodiments.

From the foregoing, it will be appreciated that specific embodiments of the technology have been described herein for purposes of illustration, but well-known structures and functions have not been shown or described in detail to avoid unnecessarily obscuring the description of the embodiments of the technology. To the extent any material incorporated herein by reference conflicts with the present disclosure, the present disclosure controls. Where the context permits, singular or plural terms may also include the plural or singular term, respectively. Moreover, unless the word "or" is expressly limited to mean only a single item exclusive from the other items in reference to a list of two or more items, then the use of "or" in such a list is to be interpreted as including (a) any single item in the list, (b) all of the items in the list, or (c) any combination of the items in the list. Furthermore, as used herein, the phrase "and/or" as in "A and/or B" refers to A alone, B alone, and both A and B. Additionally, the terms "comprising," "including," "having," and "with" are used throughout to mean including at least the recited feature(s) such that any greater number of the same features and/or additional types of other features are not precluded. Moreover, as used herein, the phrases "based on," "depends on," "as a result of," and "in response to" shall not be construed as a reference to a closed set of conditions. For example, an exemplary step that is described as "based on condition A" may be based on both condition A and condition B without departing from the scope of the present disclosure. In other words, as used herein, the phrase "based on" shall be construed in the same manner as the phrase "based at least in part on" or the phrase "based at least partially on."

Spatially relative terms, such as "beneath," "below," "over," "under," "above," "upper," "top," "bottom," "left," "right," "center," "middle," "forward," "away," and the like, are used herein for case of description to describe one element or feature's relationship relative to another element(s) or feature(s) as illustrated in the drawings. It will be understood that the spatially relative terms are intended to encompass different orientations of the device or system in use or operation in addition to the orientation depicted in the drawings. For example, if a device or system in the drawings is rotated or turned over, elements described as "below" or "beneath" or "under" other elements or features would then be oriented "above" the other elements or features. Thus, the exemplary terms "below" and "under" can encompass both an orientation of above and below. The device may be otherwise oriented (rotated ninety degrees or at other orientations) and the spatially relative descriptors used herein are interpreted accordingly. In addition, it will also be understood that when an element is referred to as being "between" two other elements, it can be the only element between the two other elements, or one or more intervening elements may also be present.

From the foregoing, it will also be appreciated that various modifications may be made without deviating from the disclosure or the technology. For example, one of ordinary skill in the art will understand that various components of the technology can be further divided into subcomponents, or that various components and functions of the technology may be combined and integrated. In addition, certain aspects of the technology described in the context of particular embodiments may also be combined or eliminated in other embodiments. Furthermore, although advantages associated with certain embodiments of the technology have been described in the context of those embodiments, other embodiments may also exhibit such advantages, and not all embodiments need necessarily exhibit such advantages to fall within the scope of the technology. Accordingly, the disclosure and associated technology can encompass other embodiments not expressly shown or described herein.

What is claimed is:

1. A screwdriver, comprising:

a shaft assembly having a proximal end region and a distal end region opposite the proximal end region;

a handle at the proximal end region, the handle including a neck;

a drive tip at the distal end region, the drive tip transformable between (i) a first configuration corresponding to a first drive tip and (ii) a second configuration corresponding to a second drive tip different from the first drive tip; and a rotation mechanism including a cavity and configured to transition the drive tip between the first configuration and the second configuration, wherein the rotation mechanism is seated on the neck of the handle such that at least part of the neck is received in the cavity.

2. The screwdriver of claim 1 wherein the shaft assembly includes (i) a first shaft and (ii) a second shaft different from the first shaft.

3. The screwdriver of claim 2 wherein:

the first shaft and/or the second shaft include first threading;

the rotation mechanism includes second threading corresponding to the first threading; and the first threading is engageable with the second threading such that (i) rotation of the rotation mechanism in a first direction drives the second shaft toward the distal end region of the shaft assembly and (ii) rotation of the rotation mechanism in a second direction different from the first direction retracts the second shaft away from the distal end region of the shaft assembly.

4. The screwdriver of claim 2 wherein the first shaft includes a first drive tip portion that corresponds to at least part of the drive tip when the drive tip is in the second configuration.

5. The screwdriver of claim 4 wherein the second drive tip corresponds to a flathead drive tip.

6. The screwdriver of claim 4 wherein the second shaft includes a second drive tip portion that corresponds to at least part of the drive tip when the drive tip is in the first configuration.

7. The screwdriver of claim 6 wherein the first drive tip corresponds to a cross-head drive tip.

8. The screwdriver of claim 6 wherein the first drive tip portion of the first shaft corresponds to at least another part of the drive tip when the drive tip is in the first configuration.

9. The screwdriver of claim 2 wherein the second shaft is moveable generally along a longitudinal axis of the first shaft.

10. The screwdriver of claim 2 wherein the second shaft is at least partially positioned within the first shaft.

11. The screwdriver of claim 10 wherein:

the first shaft includes a first notch that extends generally along at least part of a longitudinal axis of the first shaft;

the second shaft includes a second notch that is positioned at a distal end portion of the second shaft and that extends generally along at least part of a longitudinal axis of the second shaft; and the first shaft and the second shaft are interlocked with each other via the first and second notches and such that the longitudinal axes of the first and second shafts are arranged generally parallel to each other.

12. The screwdriver of claim 11 wherein a lateral axis of the first shaft is arranged generally orthogonal to a lateral axis of the second shaft.

13. The screwdriver of claim 2 wherein a proximal end portion of the first shaft is fixedly held within the handle.

14. The screwdriver of claim 1 wherein:

the handle includes a protrusion on the neck;

the cavity of the rotation mechanism includes a recess corresponding to the protrusion; and the rotation mechanism is seated on the neck such that (i) the protrusion is seated within the recess and (ii) the rotation mechanism is rotatable generally about a longitudinal axis of the screwdriver.

15. The screwdriver of claim 1 wherein the drive tip is transformable between the first configuration and the second configuration (i) without detaching portions of the shaft assembly from the screwdriver and (ii) without detaching portions of the drive tip from the screwdriver.

16. A screwdriver, comprising:

a shaft assembly having (i) a proximal end region, (ii) a distal end region opposite the proximal end region, (iii) a first shaft including a first drive tip portion, and (iv) a second shaft including a second drive tip portion;

a handle at the proximal end region;

a drive tip at the distal end region, the drive tip transformable between (i) a first configuration corresponding to a first drive tip and (ii) a second configuration corresponding to a second drive tip different from the first drive tip; and a rotation mechanism configured to transition the drive tip between the first configuration and the second configuration, wherein, when the drive tip is in the first configuration, a combination of the first drive tip portion of the first shaft and the second drive tip portion of the second shaft forms the drive tip.

17. A method of converting a drive tip of a screwdriver between (i) a first configuration corresponding to a first drive tip and (ii) a second configuration corresponding to a second drive tip different from the first drive tip, the method comprising:

moving a second shaft of a shaft assembly of the screwdriver generally along a first shaft of the shaft assembly, wherein the first shaft includes a first drive tip portion, wherein the second shaft includes a second drive tip portion, wherein, when the drive tip is in the second configuration, a combination of the first drive tip portion of the first shaft and the second drive tip portion of the second shaft forms the drive tip, and further wherein moving the second shaft generally along the first shaft includes (i) retracting the second drive tip portion in a first direction generally toward a handle of the screwdriver at a proximal end region of the shaft assembly to convert the drive tip to the first configuration or (ii) extending the second drive tip portion in a second direction generally away from the handle to convert the drive tip to the second configuration.

18. The method of claim 17 wherein moving the second shaft generally along the first shaft includes rotating a rotation mechanism of the screwdriver to engage threading on the shaft assembly and thereby retract the second drive tip portion in the first direction generally toward the handle to isolate the first drive tip portion and convert the drive tip to the first configuration.

19. The method of claim 17 wherein moving the second shaft generally along the first shaft includes rotating a rotation mechanism of the screwdriver to engage threading on the shaft assembly and thereby extend the second drive tip portion in the second direction generally away from the handle and toward the first drive tip portion such that the second drive tip portion combines with the first drive tip portion to convert the drive tip to the second configuration.

* * * * *